(12) United States Patent
Rief et al.

(10) Patent No.: US 10,892,626 B2
(45) Date of Patent: Jan. 12, 2021

(54) POWER ADAPTER FOR CORDLESS POWER TOOLS

(71) Applicant: HUSQVARNA AB, Huskvarna (SE)

(72) Inventors: Joachim Rief, Biberach (DE); Corinna Mönch, Neu-Ulm (DE); Fritz Laible, Asselfingen (DE); Peter Rudolf, Senden (DE); Tobias Zeller, Neu-Ulm (DE)

(73) Assignee: HUSQVARNA AB, Huskvarna (SE)

( * ) Notice: Subject to any disclaimer, the term of this patent is extended or adjusted under 35 U.S.C. 154(b) by 274 days.

(21) Appl. No.: 15/453,142

(22) Filed: Mar. 8, 2017

(65) Prior Publication Data

US 2017/0179742 A1 Jun. 22, 2017

Related U.S. Application Data

(63) Continuation of application No. 14/385,529, filed as application No. PCT/EP2013/055698 on Mar. 19, 2013, now abandoned.

(30) Foreign Application Priority Data

Mar. 19, 2012 (WO) .............. PCT/EP2012/054847

(51) Int. Cl.
| | |
|---|---|
| *H02J 7/00* | (2006.01) |
| *H01M 2/10* | (2006.01) |
| *B25F 5/02* | (2006.01) |
| *H01M 10/48* | (2006.01) |

(52) U.S. Cl.
CPC .............. *H02J 7/0044* (2013.01); *B25F 5/02* (2013.01); *H01M 2/1022* (2013.01); *H02J 7/0047* (2013.01); *H01M 10/488* (2013.01); *H02J 7/0048* (2020.01)

(58) Field of Classification Search
USPC ................................................. 320/112–114
See application file for complete search history.

(56) References Cited

U.S. PATENT DOCUMENTS

| | | | |
|---|---|---|---|
| 3,657,021 A | 4/1972 | Mathews | |
| 4,505,058 A | 3/1985 | Peterson | |
| 4,595,872 A * | 6/1986 | Ball | ........................ G06F 1/30 |
| | | | 307/66 |
| 4,632,888 A | 12/1986 | Kump et al. | |

(Continued)

FOREIGN PATENT DOCUMENTS

| | | |
|---|---|---|
| CN | 201076146 Y | 6/2008 |
| CN | 201156561 Y | 11/2008 |

(Continued)

OTHER PUBLICATIONS

International Search Report and Written Opinion in International patent application No. PCT/EP2012/054846 dated Jul. 17, 2012.

(Continued)

*Primary Examiner* — Samuel Berhanu
(74) *Attorney, Agent, or Firm* — Burr & Forman, LLP

(57) ABSTRACT

The present application is directed in particular to a power adapter, adapted to be connected on the one hand to a power interface of a cordless power tool and adapted to be connected on the other hand to an energy source, in particular mobile energy source, for electrically power the power tool via the power adapter.

7 Claims, 17 Drawing Sheets

(56) References Cited

U.S. PATENT DOCUMENTS

| | | |
|---|---|---|
| 5,095,259 A | 3/1992 | Bailey et al. |
| 5,105,958 A | 4/1992 | Patton |
| 5,213,913 A | 5/1993 | Anthony, III et al. |
| 5,289,605 A | 3/1994 | Armbruster |
| 5,368,954 A | 11/1994 | Bruns |
| 5,401,592 A | 3/1995 | Gilpin et al. |
| 5,628,443 A | 5/1997 | Deutsch |
| 5,680,026 A | 10/1997 | Lueschen |
| 5,697,808 A | 12/1997 | Chen |
| 5,732,867 A | 3/1998 | Perkins et al. |
| 5,881,823 A | 3/1999 | Kabatnik et al. |
| 5,929,597 A | 7/1999 | Pfeifer et al. |
| 5,954,250 A | 9/1999 | Hall et al. |
| 6,031,183 A | 2/2000 | Guerrieri |
| 6,066,211 A | 5/2000 | Sandell |
| 6,087,815 A | 7/2000 | Pfeifer et al. |
| 6,106,971 A | 8/2000 | Spotnitz |
| 6,168,881 B1 | 1/2001 | Fischer et al. |
| 6,181,032 B1 | 1/2001 | Marshall et al. |
| 6,290,111 B1 | 9/2001 | Hedenberg et al. |
| 6,357,533 B1 | 3/2002 | Buchholz et al. |
| 6,357,534 B1 | 3/2002 | Buetow et al. |
| 6,412,572 B2 | 7/2002 | Habedank et al. |
| 6,501,197 B1 | 12/2002 | Cornog et al. |
| 6,597,152 B1 | 7/2003 | Jacobs et al. |
| 6,615,930 B2 | 9/2003 | Bongers-Ambrosius et al. |
| 6,840,335 B1 | 1/2005 | Wu |
| 6,848,120 B2 | 2/2005 | Kling et al. |
| 6,967,465 B2 | 11/2005 | Takano et al. |
| 7,015,675 B1 | 3/2006 | Andre |
| 7,025,627 B2 | 4/2006 | Rosenthal et al. |
| 7,052,799 B2 | 5/2006 | Zatezalo et al. |
| 7,145,314 B2 | 12/2006 | Aradachi et al. |
| 7,157,883 B2 | 1/2007 | Johnson et al. |
| 7,198,186 B2 | 4/2007 | Kling et al. |
| 7,243,734 B2 | 7/2007 | Wu |
| 7,382,104 B2 | 6/2008 | Jacobson et al. |
| 7,429,430 B2 | 9/2008 | Mooty et al. |
| 7,443,137 B2 * | 10/2008 | Scott ................... B25F 5/02 320/114 |
| 7,455,544 B2 | 11/2008 | Glauning et al. |
| 7,554,287 B2 | 6/2009 | Duesselberg |
| 7,567,058 B2 | 7/2009 | Shimizu et al. |
| 7,592,773 B2 | 9/2009 | Pellenc |
| 7,648,383 B2 | 1/2010 | Matthias et al. |
| 7,661,486 B2 | 2/2010 | Turner et al. |
| 7,670,714 B2 | 3/2010 | Matthias |
| 7,679,323 B2 | 3/2010 | Roehm et al. |
| 7,766,097 B2 | 8/2010 | Kondo |
| 7,816,888 B2 | 10/2010 | Rejman et al. |
| 7,828,185 B2 | 11/2010 | Hofmann et al. |
| 7,858,219 B2 | 12/2010 | Agehara et al. |
| 7,867,663 B2 | 1/2011 | Park et al. |
| 7,879,479 B2 | 2/2011 | Roehm et al. |
| 7,879,482 B2 | 2/2011 | Matthias |
| 7,883,360 B2 | 2/2011 | Hirt |
| 7,887,942 B2 | 2/2011 | Rejman et al. |
| 7,932,694 B2 * | 4/2011 | Watanabe ............. H02J 7/0006 320/113 |
| 7,940,025 B2 | 5/2011 | Duesselberg |
| 7,997,466 B2 | 8/2011 | Fidrych et al. |
| 7,999,507 B2 | 8/2011 | Heinen |
| 8,006,877 B2 | 8/2011 | Lowry et al. |
| 8,066,164 B2 | 11/2011 | Gregory |
| D653,325 S | 1/2012 | Cheesman et al. |
| 8,092,932 B2 | 1/2012 | Phillips et al. |
| 8,123,098 B2 | 2/2012 | Miyata |
| 8,133,064 B2 | 3/2012 | Nishimura |
| 8,148,000 B2 | 4/2012 | Furuta et al. |
| 8,163,414 B2 | 4/2012 | Wan et al. |
| 8,573,454 B2 | 11/2013 | Tolentino et al. |
| 9,224,994 B2 | 12/2015 | Ota et al. |
| 9,337,677 B2 | 5/2016 | Suzuki |
| 2001/0035736 A1 | 11/2001 | Person |
| 2002/0030466 A1 | 3/2002 | Tracey |
| 2002/0125757 A1 | 9/2002 | LeTournoux |
| 2002/0125857 A1 | 9/2002 | Mastaler et al. |
| 2003/0090162 A1 | 5/2003 | Cornog et al. |
| 2003/0090239 A1 | 5/2003 | Sakakibara |
| 2003/0121682 A1 | 7/2003 | Carrancho |
| 2004/0081882 A1 | 4/2004 | Ontl |
| 2004/0173656 A1 | 9/2004 | Seong |
| 2004/0192106 A1 | 9/2004 | Britz |
| 2005/0161305 A1 | 7/2005 | Jenni et al. |
| 2006/0091856 A1 | 5/2006 | Lee et al. |
| 2006/0199072 A1 | 9/2006 | Lui et al. |
| 2006/0220612 A1 * | 10/2006 | Feldmann ............... B25F 5/022 320/114 |
| 2006/0222931 A1 | 10/2006 | Lin |
| 2006/0244414 A1 | 11/2006 | Lay |
| 2007/0090796 A1 | 4/2007 | Norris |
| 2007/0173090 A1 | 7/2007 | Johnson et al. |
| 2007/0277987 A1 | 12/2007 | Meyer et al. |
| 2007/0292749 A1 | 12/2007 | Coombs et al. |
| 2008/0003495 A1 | 1/2008 | Shimizu |
| 2008/0012526 A1 * | 1/2008 | Sadow ................... H02J 7/0044 320/111 |
| 2008/0192432 A1 * | 8/2008 | Hsu Huang ........ H05K 7/20145 361/697 |
| 2008/0207026 A1 | 8/2008 | Meyer et al. |
| 2008/0211327 A1 | 9/2008 | Schlegel et al. |
| 2008/0241653 A1 | 10/2008 | Chang |
| 2008/0311795 A1 | 12/2008 | Brotto et al. |
| 2009/0071990 A1 | 3/2009 | Jardine et al. |
| 2009/0148755 A1 | 6/2009 | Heinen et al. |
| 2009/0252994 A1 | 10/2009 | Livingston |
| 2010/0000097 A1 | 1/2010 | Johnson |
| 2010/0062326 A1 | 3/2010 | Konuma et al. |
| 2010/0136425 A1 | 6/2010 | Gau et al. |
| 2010/0197209 A1 * | 8/2010 | Dehde ..................... B24B 7/00 451/344 |
| 2010/0221589 A1 | 9/2010 | Friedli et al. |
| 2010/0282252 A1 | 11/2010 | Cheesman et al. |
| 2010/0291419 A1 | 11/2010 | Zhou |
| 2010/0320969 A1 * | 12/2010 | Sakakibara ......... H01M 2/1022 320/118 |
| 2011/0005088 A1 | 1/2011 | Pellenc |
| 2011/0012560 A1 * | 1/2011 | Sakakibara ......... H01M 10/441 320/118 |
| 2011/0016674 A1 | 1/2011 | Jablonski |
| 2011/0162219 A1 | 7/2011 | Okouchi |
| 2011/0197389 A1 | 8/2011 | Ota et al. |
| 2011/0198103 A1 | 8/2011 | Suzuki |
| 2011/0278339 A1 | 11/2011 | Hexels |
| 2012/0045678 A1 | 2/2012 | Hayashi et al. |
| 2012/0048588 A1 | 3/2012 | Iyoda et al. |
| 2012/0052356 A1 * | 3/2012 | Sugiura ................... B25F 5/00 429/99 |
| 2012/0318546 A1 * | 12/2012 | Gray ..................... H01M 2/1055 173/20 |
| 2013/0042376 A1 | 2/2013 | Hexels |
| 2013/0103169 A1 * | 4/2013 | Wuertele ................ G05B 19/02 700/83 |
| 2013/0335013 A1 * | 12/2013 | Suzuki ................ H01M 2/1055 320/107 |
| 2014/0345604 A1 | 11/2014 | Wang et al. |

FOREIGN PATENT DOCUMENTS

| | | |
|---|---|---|
| CN | 201369348 Y | 12/2009 |
| CN | 201402850 Y | 2/2010 |
| CN | 201405719 Y | 2/2010 |
| CN | 101743799 A | 6/2010 |
| CN | 101890900 A | 11/2010 |
| CN | 202016044 U | 10/2011 |
| CN | 102263217 A | 11/2011 |
| CN | 202042530 U | 11/2011 |
| CN | 202159716 U | 3/2012 |
| DE | 4301508 A1 | 7/1994 |
| DE | 29910045 U1 | 10/1999 |
| DE | 20116741 U1 | 2/2002 |
| DE | 10302000 A1 | 7/2004 |
| DE | 202005018897 U1 | 2/2006 |

(56) References Cited

FOREIGN PATENT DOCUMENTS

| | | |
|---|---|---|
| DE | 202007016137 U1 | 5/2008 |
| EP | 1075906 A2 | 2/2001 |
| EP | 0823840 B1 | 6/2002 |
| EP | 2099085 A2 | 9/2009 |
| EP | 2284928 A2 | 2/2011 |
| EP | 2333874 A1 | 6/2011 |
| EP | 2398108 A1 | 12/2011 |
| FR | 2623345 A1 | 5/1989 |
| FR | 2916320 A1 | 11/2008 |
| GB | 2383765 A | 7/2003 |
| JP | 62066562 A | 3/1987 |
| JP | H0911759 A | 1/1997 |
| JP | H106248 A | 1/1998 |
| JP | H1015839 A | 1/1998 |
| JP | H1015851 A | 1/1998 |
| JP | H11129960 A | 5/1999 |
| JP | 2000123806 A | 4/2000 |
| JP | 2000133222 A | 5/2000 |
| JP | 2000208114 A | 7/2000 |
| JP | 2002260618 A | 9/2002 |
| JP | 2002260619 A | 9/2002 |
| JP | 2002373708 A | 12/2002 |
| JP | 3915376 B2 | 5/2007 |
| JP | 2007287492 A | 11/2007 |
| JP | 2008047325 A | 2/2008 |
| JP | 2009069494 A | 4/2009 |
| JP | 4580746 B2 | 11/2010 |
| JP | 2011071567 A | 4/2011 |
| JP | 2011142104 A | 7/2011 |
| JP | 2011216304 A | 10/2011 |
| WO | 9725896 A1 | 7/1997 |
| WO | 2000038255 A1 | 6/2000 |
| WO | 2001041235 A1 | 6/2001 |
| WO | 2011037451 A1 | 3/2011 |
| WO | 2011129171 A1 | 10/2011 |
| WO | 2012005159 A1 | 1/2012 |
| WO | 2012008244 A1 | 1/2012 |
| WO | 2012048240 A2 | 4/2012 |

OTHER PUBLICATIONS

International Search Report and Written Opinion for International Application No. PCT/EP2012/054847 dated Jul. 18, 2012.
International Search Report and Written Opinion in International patent application No. PCT/EP2012/073444 dated Apr. 8, 2013.
International Search Report and Written Opinion for International Application No. PCT/EP2013/055698 dated Nov. 7, 2013.
International Preliminary Report on Patentability in International patent application No. PCT/EP2012/054846 dated Sep. 23, 2014.
International Preliminary Report on Patentability for International Application No. PCT/EP2012/054847 dated Sep. 23, 2014.
International Preliminary Report on Patentability in International patent application No. PCT/EP2012/073444 dated Sep. 23, 2014.
International Preliminary Report on Patentability for International Application No. PCT/EP2013/055698 dated Sep. 23, 2014.

* cited by examiner

POWER ADAPTER FOR CORDLESS POWER TOOLS

CROSS REFERENCE TO RELATED APPLICATIONS

This application is a continuation of U.S. application Ser. No. 14/385,529 filed Sep. 16, 2014, which is a national phase entry of PCT/EP2013/055698 filed Mar. 19, 2013, which claims priority to PCT/EP2012/054847 filed Mar. 19, 2012, the entire contents of each of which are incorporated in their entirety.

TECHNICAL FIELD

The present invention relates to a power adapter for cordless power tools.

BACKGROUND

Cordless electrically operated power tools such as hedge trimmers, clearing saws, chain saws, brush cutters, trimmers, blowers, screw drivers, drills, hammer drills, nailers, staplers, polishing or grinding tools, need to be operated by batteries and provide a wide operating range since no electrical cables are provided.

Due to the increasing demand for elongated operating intervals for cordless power tools, larger batteries with higher capacities may be used. However, larger batteries having higher weights adversely affect comfort and ergonomy of operating the cordless tool, in particular power tool.

SUMMARY

Therefore, in particular it is one object of the invention to provide a possibility of operating cordless tools, in particular cordless power tools, in a comfortable and/or ergonomic way even if energy sources, in particular battery systems, with larger loading or charging capacities are used. Further, an energy source assembly, power tool assembly and energy source and power tool assembly shall be provided.

A power adapter is provided, which is to be mounted in an electrical power tool for electrically powering the power tool and comprises an electrical interface to be electrically connected to a power interface of a cordless power tool on the one hand and another electrical interface to be electrically connected to an external electrical energy source, in particular a battery assembly to be carried such as a backpack battery assembly or a belt battery assembly, on the other hand, wherein in an indirect powering operation no battery is present in the power adapter and/or power tool itself, but the power tool is powered by the external electrical energy source through the power adapter.

The indirect powering operation shall comprise all situations, in which the power tool is operable exclusively by an external energy source, such as a battery pack and/or a power grid or power network.

The fact that "no battery is present in the power adapter" in particular shall mean, that the power adapter is not provided with or at least temporarily does not incorporate, an independent electrical power reservoir or source which would enable to cordlessly operate the power tool.

A cordless power tool in particular shall be understood as a power tool, which, for ordinary operation, does not require a cable connection to a fixed or stationary electrical power source such as an energy generator or an electrical network or grid.

Rather, cordless power tools, in particular cordless power tools as rendered possible by the present invention, shall in particular be understood as power tools that can be operated in a stand-alone manner, in particular providing electric self-supply, such as for example with a passive energy source, such as a secondary battery or accumulator.

Note that a cordless power tool as rendered possible by the present invention, and in the broader sense, shall be understood as a stand-alone power tool or standalone power tool arrangement comprising battery packs either attached directly or indirectly thereto. Indirect connections may in particular comprise electrical connections to backpack battery packs and the like. It shall be stressed, that even in the event that the power tool is connected to a portable backpack energy source or the like via a cable, a respective power tool nevertheless is considered a cordless power tool. This in particular is the case as providing a backpack energy source does not require a fixed energy source or grid.

In embodiments, the power adapter may comprise at least one balancing weight. The balancing weight is adapted and configured for weight balancing the power tool in the indirect powering operation.

In other words, the balancing weight may be provided for acting as a counter weight for other operational components of the power tool in cases where no secondary battery of considerable weight is connected thereto. In particular, the counter weight may be configured so as to imitate the presence, in particular weight, of a conventional secondary battery, which hitherto is usual for cordless electrical power tools.

In particular, the counter weight may be adapted to provide the impression and to provide handling features comparable to the direct powering operation in which a secondary battery is provided and coupled to a respective interface of the power tool for powering the same. The balancing weight may provide advantageous weight distribution, and a favorable center of mass for the power tool. Also, in some cases the balancing weight may be provided for the reason to fulfill legal standards.

The proposed power adapter, either with or without balancing weight, may be used, for example, to connect to any type of cordless tool adapted to be powered by a network-independent energy source, i.e. off the line or by a battery energy source, such as a secondary battery, in particular a battery unit having enhanced loading capacity. As already indicated, a respective battery unit may for example be a backpack energy source, i.e. a mobile energy source, in particular battery pack, specially adapted to be carried on the back of the user, in particular via at least one shoulder strap. Backpack energy sources are advantageous with respect to and can be designed for high wear comfort and ergonomics. However, also other types of energy sources, in particular battery packs, such as single shoulder strap type mobile battery packs, are conceivable.

Advantageously the power adapter comprises a housing adapted to accommodate, in particular on an outer and/or inner side, the balancing weight in the indirect powering operation. Furthermore, the power adapter may comprise a fixture unit into or onto which the balancing weight is fixed.

In an embodiment the fixture unit comprises a first fixture sub-unit and a second fixture sub-unit which are or can be connected by means of fastening elements to form the fixing unit. At least one balancing weight is now fixed to the first fixture sub-unit and/or the to the second fixture sub-unit before connection with the other sub-unit, preferably into a receiving space enclosed by a side wall of the sub-unit and/or is arranged in an inner space between the first fixture sub-unit and the second fixture sub-unit.

The housing is preferably adapted to removably, in particular slidably, accommodate therein and/or thereon the fixture unit with the balancing weight.

In embodiments, the housing may comprise a base section and a cap or dome shaped cover. The base section and cover may be adapted to be combined and/or connected with each other to establish a casing, in particular an essentially closed housing, for accommodating therein in particular the balancing weight and other components of the power adapter.

In more general terms, the casing may provide an inner space for accommodating therein electronics, cables, in particular the balancing weight and/or other elements of the power adapter.

It is preferred, that the balancing weight is mounted to the base. Here, in general any type of mounting connections may be used, in particular clamping, screwing, snapping and the like.

Using the base section as a mounting base for the balancing weight may provide advantages for mounting the overall power adapter. In particular, the base section may be used and adapted for mounting or preassembling all the essential components of the adapter, and thereafter, the base section may be coupled to the cover to finally enclose all essential elements preassembled to the base.

In further embodiments, the base section comprises a recess adapted to accommodate a printed circuit board or similar control electronics, in particular for adequately controlling operation of the power adapter and power tool.

The power adapter may further comprise a support plate adapted to support the balancing weight while at the same time bridging the recess. The support plate is adequate for avoiding or preventing the balancing weight to exert mechanical loads to the control electronics, in particular printed circuit board.

The support plate is preferably adapted to bridge the recess in that flanges or webs are supported laterally adjacent to the recess, in particular on or at respective ribs. The flanges or webs may be implemented with or at the support plate or with or at the base section.

It shall be noted, that the control electronics, preferably a printed circuit board, which preferably is arranged below the balancing weight, optionally separated therefrom by the support plate, may be potted within the base section.

In embodiments, the power adapter may comprise a retaining bracket adapted and configured for bracket or clamp fastening the balancing weight to or against the base section.

Using a mounting or fastening bracket may be advantageous in view of assembly efficiency. The bracket may be U-shaped and/or pot-shaped and may in particular provide a rectangular clamping volume for clamping rectangular balancing weights.

It shall be noted that the clamping volume may be of any other shape. The balancing weight, by the way, may be any object or body suitable for being attached to the base section, in particular any metallic object of standardized shape having sufficient or adequate shape and corrosion resistance and other relevant characteristics.

In embodiments, the bracket comprises support sections or jibs, preferably protruding from the retaining bracket, preferably in a lateral direction. The support sections may be adapted to support the support bracket and balancing weight against at least one inner wall of the housing, in particular cover.

The support sections are advantageous for adequately fixing and supporting the balancing weight within the housing, in particular for protecting fastening elements and fixings against high impact loads.

The support sections may in addition be used and configured as cable support bars, which in particular shall mean that the support bars may be used for cable routing functions within the housing.

In further embodiments, the retaining bracket may comprise an integrated cable clamp section configured to clamp an electric supply cable of the power adapter, i.e. to be used for cable routing within the housing. Here, a high level of integration can be obtained, which may provide advantages during assembly. Further, as the bracket is adapted for retaining the balancing weight and therefore is comparatively robust, cables, such as supply cables, can be safely fixed.

In embodiments, the base section comprises a cable bushing. A cable bushing in particular shall mean a type of opening allowing a cable, in particular an electric supply cable, to be guided through the base section to the inner of the housing.

At the outer side, i.e. at the side external to the housing interior, the bushing may be implemented as a cone or funnel shaped deepening. Such a cone or funnel shaped deepening may comprise bended walls, in particular convex walls, adapted to allow smooth bending of the cable within the bushing, whilst avoiding sharp bends of the cable.

The cone or funnel, i.e. deepening, may be of rotational symmetric, i.e. isotropic, design. However, the cone or funnel may also be implemented in an anisotropic design, in which walls of the cone or funnel show different bending radii and ascent angles with respect to different bending directions.

In a view from the outside of the housing, the deepening comprises widening walls, which in particular shall mean that the axial cross section of the deepening gradually widens or increases towards the outside of the housing.

In an embodiment the power adapter comprises in or for a direct powering operation, instead of the at least one balancing weight, at least one battery for powering the power tool, wherein the weight of the battery is used for balancing the power tool. The power adapter in these cases may be adapted to the power tool, and the power tool then implements a self-powered device.

In particular, the power adapter is adapted to accommodate balancing weights of different mass in the indirect powering operation, which different masses are preferably adapted to different battery masses in the direct powering operation. The balancing weight in particular may be from steel and/or aluminum, and in particular any standard sized element or product suitable to be accommodated and/or arranged and/or fixed to the power adapter, in particular an inner interface of the power adapter, preferably housing.

In a further embodiment the power adapter comprises a slewable cable outlet for an electrical cable. The cable in particular may be used for connecting the power adapter to and with the energy source, in particular mobile energy source, in particular battery pack. Providing slewable cable outlets and/or connections adapted to connect cables to the power adapter in a slewable manner, greatly improves freedom of operation of the power tool, in particular as manual rotations or movements of the power tool can be balanced by a slewable cable outlet provided at the housing.

In particular in operation, one advantage is that the cable may always be brought best operational position, or position to work.

In a preferred further embodiment the power adapter further comprises a display unit adapted to display a charging condition and/or other parameter such as temperature of the energy source at least in the electrically connected state. Note, that if the power connector itself comprises an additional battery, the display unit may also be used to display the charging state of the additional battery or battery unit. Displaying the charging state of the energy source at the power tool, in particular power adapter is advantageous, as such display is easily accessible and/or visible to a user operating with the power tool. In particular, if the energy source is a backpack energy source, checking the charging or loading state of the backpack energy source does not require removing the backpack energy source from the back.

Therefore, it is possible, that the power adapter itself may comprise batteries, such as conventional battery packs to be attached to the power tool. These batteries may in particular be used as intermediate storage means, charged by an external mobile energy source, such as a backpack energy battery pack.

However, it is also conceivable, and it is preferred that the power adapter does not contain any batteries or accumulators. In this case, the function of the power adapter is reduced to a simple connector without any charging functions.

The housing of the power adapter is preferably designed such that it complies with the design and dimensions of a respective conventional battery pack, in particular rechargeable battery pack, of the power tool. Here, the user of the power tool will not be confronted and will not have to customize to different designs. As in one configuration, such a housing may not contain any battery units, such a power adapter may also be called a "dummy battery".

The power adapter may have the same outside geometry and interfaces as conventional batteries used with the power tools. Note that using the proposed power tool does in general not require any mechanical and/or electrical adaptations of respective power tools. Conventional battery packs and the proposed power connector preferably are fully compatible.

The balance weight thus can be used and preferably is adapted such that an optimal center of gravity is obtained with the power tool.

The fixture unit may be adapted to comprise recesses or receiving spaces enclosed by side walls for accommodating therein one or more balance weight bodies. In particular the fixture unit may be adapted to clip or plug a balance weight body thereto.

In a further embodiment, the housing and/or fixture unit is/are adapted to accommodate one or several, i.e. at least one, balancing weight of the same or of different weight. If single balance weights are used, the power adapter will correspondingly have respective different weights. It is, however, also possible, that several different balance weights can be accommodated, which in particular means that the overall weight of the power adapter can be tuned, in particular fine-tuned, in particular in accordance with the weight distribution of the power tool to be used.

In cases, in which the housing is not fully filled with the balance weight or balance weight units, the housing has free spaces which may contribute to a more efficient cooling of the power tool, in particular if cooling is provided via the housing.

However, the balance weight is of great advantage, as the ordinary and usual weight distribution prevailing with conventional battery packs attached to the power tool, can be obtained, in particular simulated. It shall be noted, that the user in most of the cases is used to conventional weight distributions, and often, the weight distribution of the power tool is adapted under consideration of the weight of the battery pack.

The balancing weight or balancing weights themselves may be accommodated slidably within or on the housing. This may contribute to easily removing/exchanging the balance weights, in particular to adapt to different weight distribution requirements.

The power adapter may be connected, in particular fixedly or removably connected, to or with a cable connected to the energy source.

In a further preferred embodiment, the power adapter, in particular the housing, is adapted to be coupled to a charging device, adapted to charge the energy source, in particular mobile energy source, such as a backpack energy source. In this way, the benefit of the power adapter is two-fold. On the one hand, the power adapter may be used to supply a power tool with energy of an external, in particular mobile energy source, while simulating battery-pack type conditions. On the other hand, the power adapter may be plugged from the power tool and, without any further actions, be plugged into the charging device. Here, time-saving operations may be obtained, in particular if interfaces of the power adapter, power tool and charging device are standardized.

The display may be any type of display, in particular 7-segment displays, digital displays, LED-displays and the like. The advantages of a LED 7-Segment-indication are the bright display, good visibility under working conditions, stable display in a wide temperature range and in particular the UV-stability.

Advantages of the proposed power adapter in particular are as follows.

The proposed power adapter allows to use bigger portable battery-packs, in particular backpack batteries. In particular, the power adapter opens the possibility to use such a backpack battery for a variety of applications, in particular handheld power equipment, i.e. power tools, or handheld power tools. Additionally, different types of battery-packs can be used in the same application, in particular handheld power equipment. For example, the handheld power equipment may have an integrated battery-pack (10S2P-type). Since the dummy-battery has the same size, in particular outside geometry, and has the same interfaces, i.e. interface geometry (like that of 10S2P-type), the backpack battery can be used for respective handheld power equipment, too, leading to elongated operational times.

A power tool assembly is provided, having a power tool with a power interface to which a power adapter according to any of the above embodiments and variants is coupled.

An energy source assembly is provided, comprising an energy source, in particular a mobile energy source, in particular a backpack energy source, in particular backpack battery or battery unit, wherein the energy source is connected via a cable connection to a power adapter according to one of the embodiments described further above and below.

An energy source and power tool assembly is provided, comprising an energy source, in particular a movable or portable energy source, and a power tool, and further comprising a power adapter according to any embodiment described further above and below, wherein the power adapter on the one hand is coupled to the power tool and on the other hand is coupled to the energy source.

The power adapter according to the invention can be used with or within any electrically operated handheld devices, in particular within power tools such as hedge trimmers, clearing saws, chain saws, brush cutters, trimmers, blowers, screw drivers, drills, hammer drills, nailers, staplers, polishing or grinding tools, etc.

BRIEF DESCRIPTION OF THE SEVERAL VIEWS OF THE DRAWING(S)

Preferred embodiments will now be described in connection with the annexed figures, in which.

DETAILED DESCRIPTION

Figure 1:
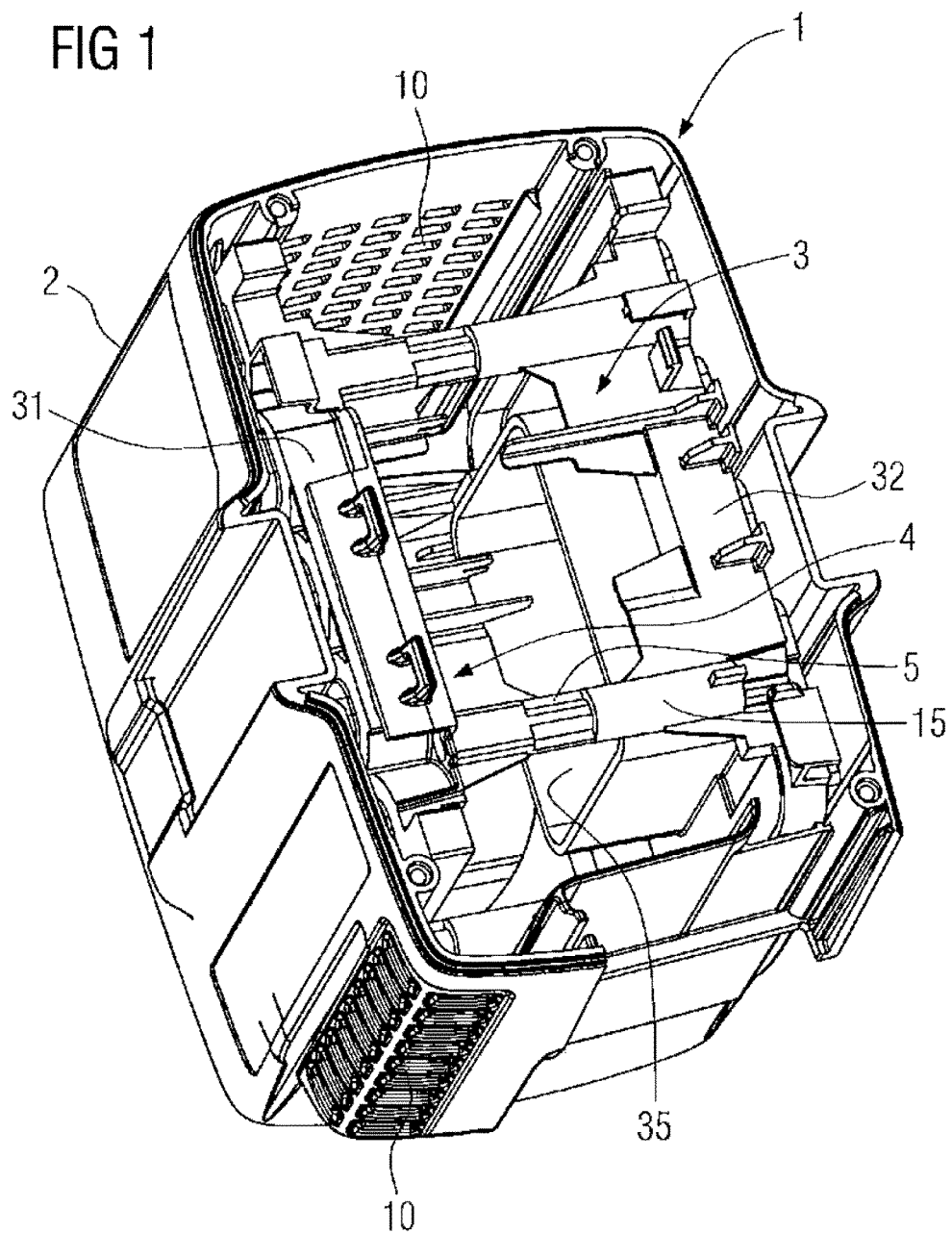
FIG. 1 shows a perspective and partially broken-up view of a power adapter.
Figure 4:
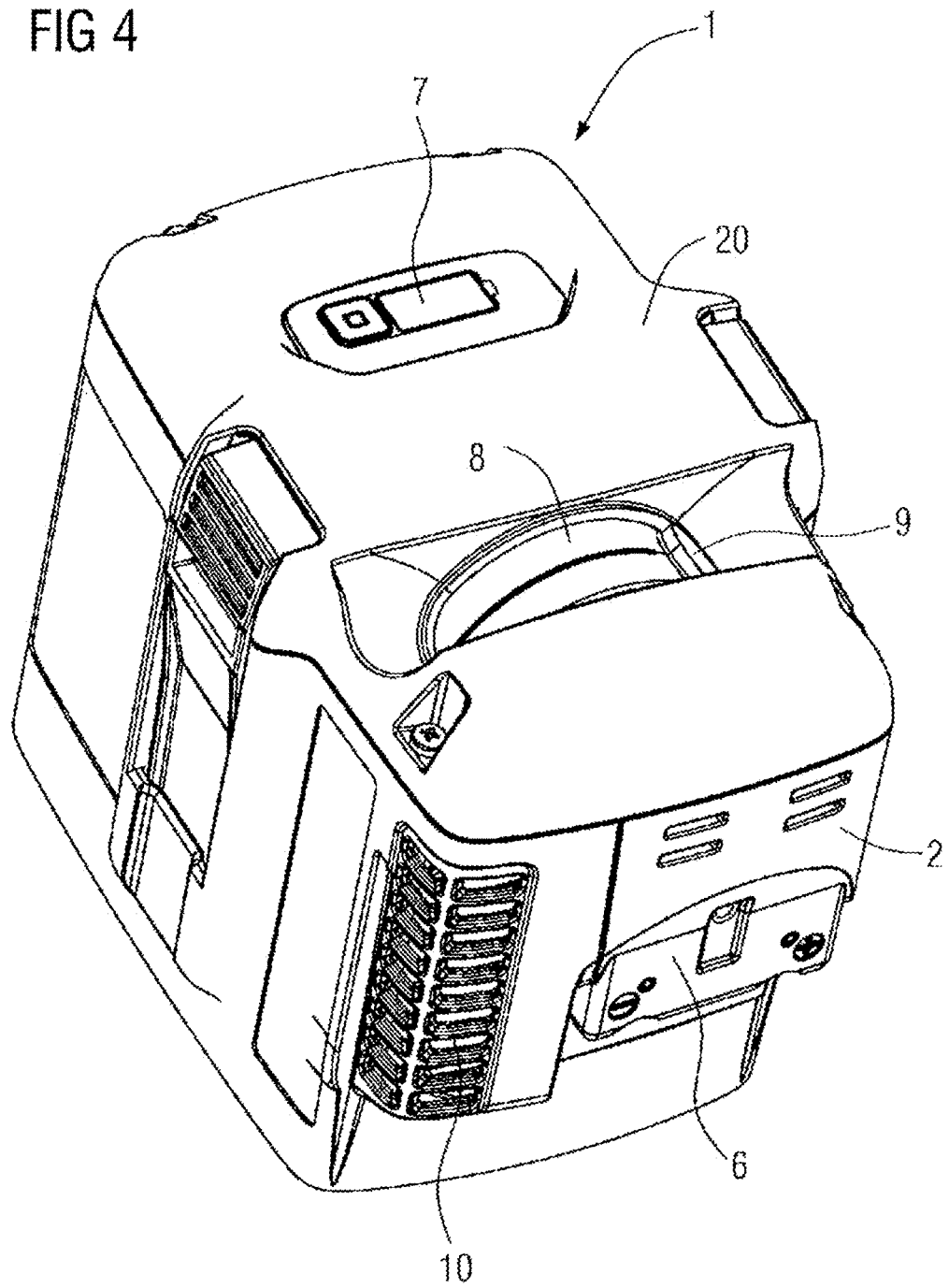
FIG. 4 shows a perspective view of the power adapter.
Figure 5:
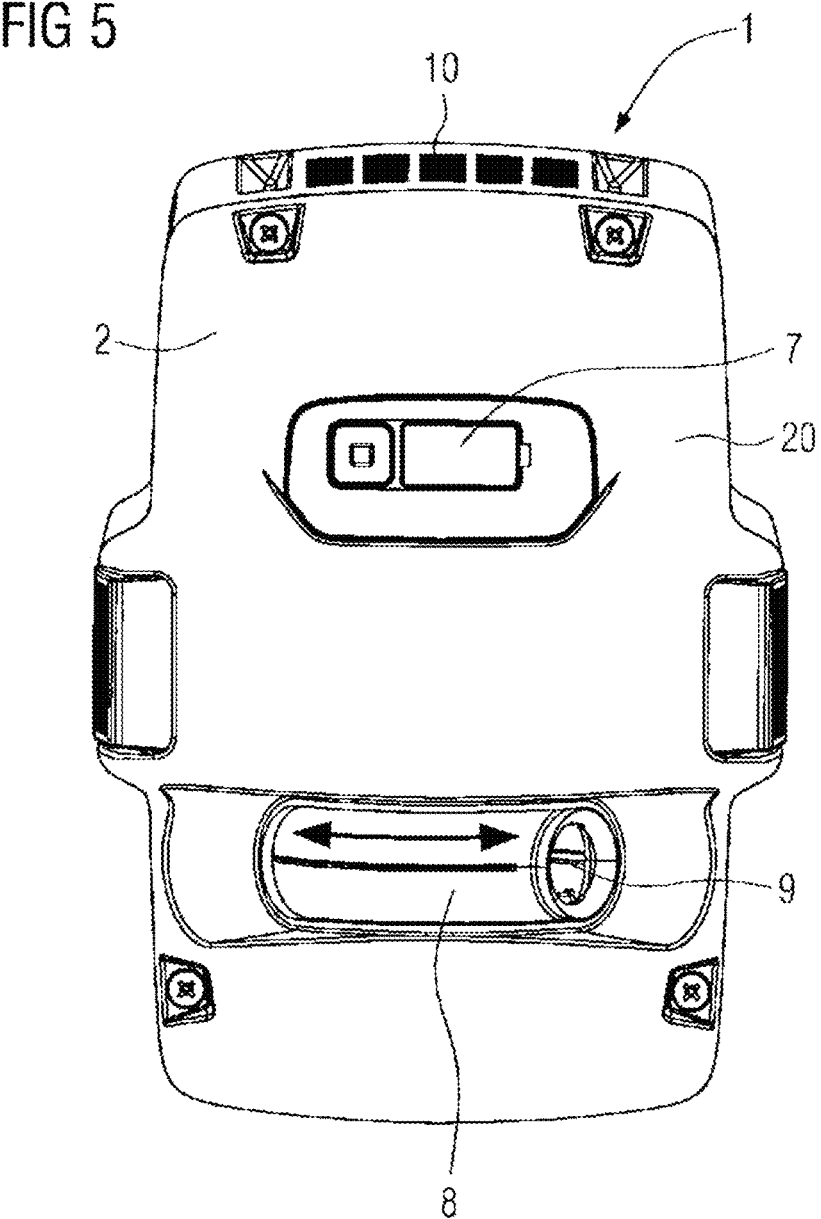
FIG. 5 shows a front view of the power adapter.

FIG. 1 shows a perspective and partially broken up view of a power adapter 1. The power adapter 1 is to be inserted into a cordless hand-held power tool (not shown) and electrically and mechanically coupled to the cordless power tool for electrical supply of the power tool. The power adapter 1 comprises an adapter housing 2 in which a fixture unit (or: insert) 3 is accommodated, in particular inserted from above and slidably placed and/or removed from the housing 2. When the fixture unit 3 is properly mounted inside the adapter housing 2, the housing 2 is closed from above by a housing lid 20 which is fixed to the main part of the housing 2, e.g. by means of screws as shown in FIGS. 4 and 5.

Figure 2:
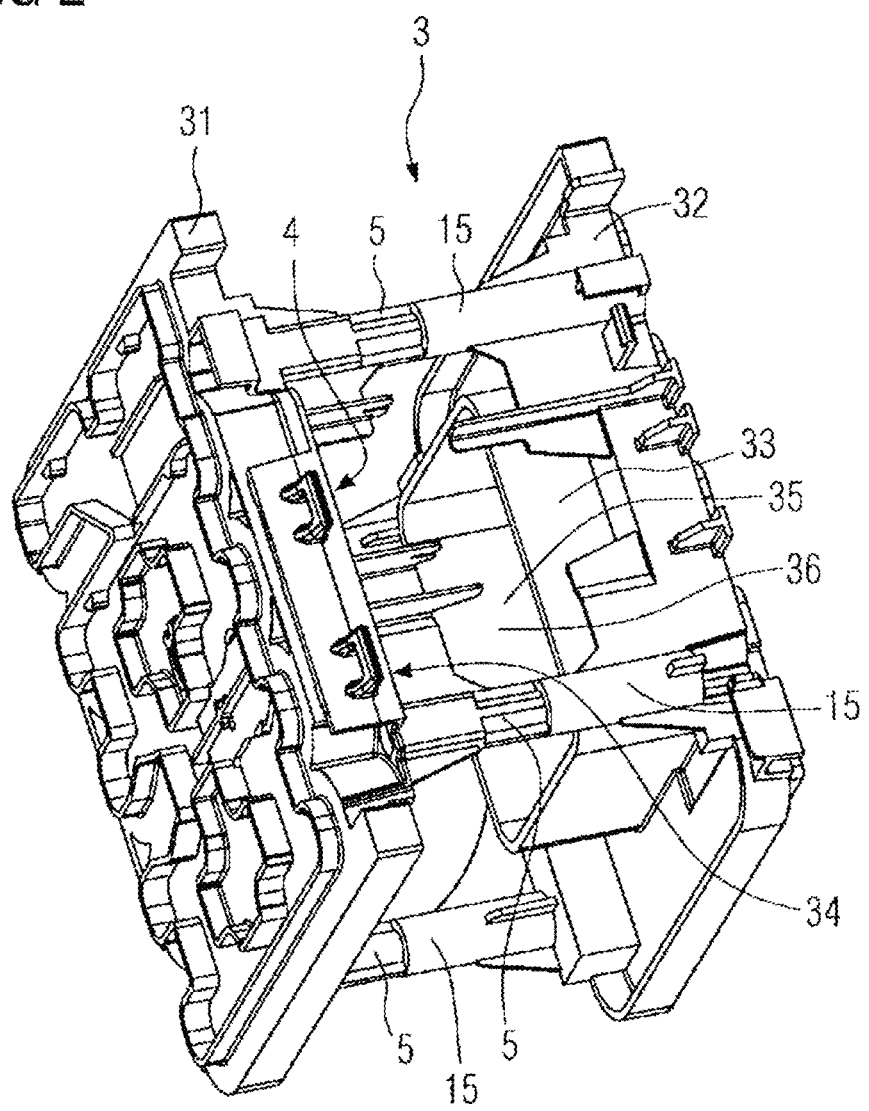
FIG. 2 shows a fixture unit of the power adapter of FIG. 1.

The fixture unit 3 without or outside of the adapter housing 2 is shown in FIG. 2. Basically the fixture unit 3 comprises two halves or two fixture sub-units 31 and 32, each preferably having a plate-like base structure and a number, in particular four, of fastening elements 5 and 15 respectively by which fastening elements 5 and 15 the fixture sub-units 31 and 32 are fastened to each other, in particular by snapping or shape-locking or also screws. In the assembled or fastened state the two fixture sub-units 31 and 32 and the fastening elements 5 and 15 form a box-like or frame-like fixture unit 3 and enclose an inner space 36 of the fixture unit 3.

The power adapter 1 comprises a contact and coupling electrical interface 6 adapted to be coupled to a respective counter interface of a cordless power tool (not shown).

In the inner space 36 of the fixture unit 3 it is, in a direct powering operation, possible to arrange battery cells (not shown) to electrically power the power tool directly from the power adapter 1 through the electrical interface 6 of the power adapter 1 being electrically coupled with a corresponding interface (not shown) of the power tool when the power adapter 1 is mounted in the power tool.

In order to insert or replace batteries the fixture unit 3 is dismounted from the housing 2 and the two fixture sub-units 31 and 32 are disassembled so that the batteries or new batteries can be mounted in between the fixture sub-units 31 and 32 or first in one of them. For this purpose a receiving space 35 (or 34) is provided at one or both of the fixture sub-units 31 and 32 being formed by a surrounding side wall 33 (or 37 [not indicated in the figures]), so that the batteries are inserted into the receiving space 35 (or 34) and held by the side wall 33 (or 37). The fixture sub-units 31 and 32 can be re-assembled and fixed by means of the fastening elements 5 and 15 again. Preferably, both side walls 33 and 37 of the receiving spaces 35 and 37 can hold or support the batteries in the power adapter 1 and are, for this purpose, opposing each other when the two fixture sub-units 31 and 32 are mounted to form the fixture unit 3.

However, when external batteries such as backpack battery assemblies to be carried on the back of the user of the power tool are used for electric supply of the power tool the power adapter 1 does not need to comprise batteries by itself. Rather, the power adapter 1 in this case is connected to the external batteries by means of a cable 9 on one hand and by its electrical interface 6 to the power tool 1 on the other hand. In this indirect powering operation case the power adapter 1 has only the passive function of electrically connecting the power tool with the external batteries, in particular backpack batteries. For the user it is somewhat like a dummy battery.

Now, the mass distribution and weight of a power tool is usually balanced for an optimum use and for this balancing the considerable weight of the batteries inside the power tool is taken into account.

However, in the indirect powering operation the power adapter 1 has no batteries and thus lacks the weight it has in the direct powering operation. This can lead to an unpleasant and different behaviour of the power tool during indirect powering operation as compared to direct powering operation.

To compensate this disadvantage a counter-weight or balancing weight 4 is provided in the power adapter 1 to reach at least approximately the same weight and balance of the power tool as if batteries were present. So, preferably for each power tool and battery set a corresponding set of balancing weights can be provided.

Preferably, the balancing weight 4 is arranged in the same region of the power adapter 2, i.e. here the inner space 36 of the fixture unit 3, where in the direct powering operation the batteries would be placed so as to emulate or produce the same balancing behaviour as if the batteries were present in the same place. In this case the balancing weight 4 can have basically the same mass as the (missing, replaced) batteries.

Figure 3:
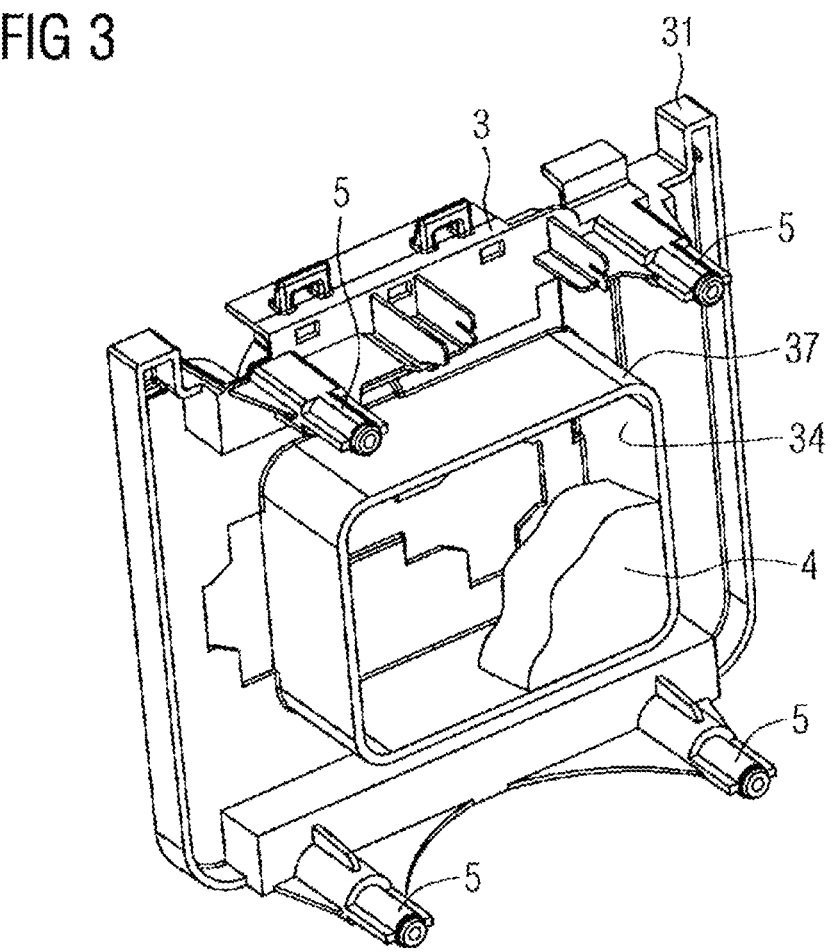
FIG. 3 shows a fixture sub-unit of the fixture unit FIG. 2 with a balancing weight in a partially sectioned view.

A preferred embodiment of how to incorporate the balancing weight 4 in the power adapter 1 is shown in FIG. 3. Here, the balancing weight 4 which is shown only partly in a partially sectioned view, is received within the receiving space 34 surrounded by the side wall 37 and the base plate at the bottom of the first fixture sub-unit 31. For instance the balancing weight 4 can be a mineral body such as concrete or any other material such as metal or a compound material of metal and mineral or plastic or resin material which is heavy enough to reach the weight of the missing batteries. The weight 4 can be produced in situ into the receiving space 34 for instance poured into it or produced separately and then fixed into the receiving space 34 for instance by press-fitting or shape-locking or glueing or any other suitable fastening means. By means of the density and the size of the weight 4 the weight of the missing batteries in the power adapter 1 can be compensated.

This embodiment has the big advantage that only the first fixture sub-unit 31 has to be changed or replaced when the power adapter 1 is to be used in indirect powering operation instead of direct powering operation. The second fixture sub-unit 32 and all other components of the power adapter 1 as well as its dimensions and mechanical interfaces and electrical interface 6 to the power tool can basically stay the same.

In an alternative embodiment both fixture sub-units 31 and 32 have a balancing weight 4 and, thus, are both replaced in the case of direct powering operation or, in other words, the whole fixation unit 3 is replaced by a fixation unit having batteries instead.

Balance weights 4 of different types, in particular different weight can be attached to the fixture unit 3. Preferably, the fixture unit 3 and balancing weight 4 of different types are designed such that the outer geometry of the fixture unit 3 with the balancing weight 4, is independent from the type of balancing weight 4, and can in any case be inserted into the housing 2.

Providing the balancing weight 4, in particular with the fixture unit 3, has the advantage that the weight of the power adapter 1, as such being clearly lighter than conventional NiMH or Li-Ion accumulator packs, can be adapted to match, in particular approximately match, the weight of the conventional battery packs. This in turn has the advantage that a favorable balance of weight can be obtained, which is or will be familiar to a user experienced in operating battery-pack driven tools. The power adapter 1 therefore simulates the presence of a conventional battery pack.

However, as the power adapter 1 can be connected to a remote battery pack, such as a backpack battery pack, as will be described further below, a battery pack of comparatively high load capacity can be used and the overall operational time can be raised.

As shown in FIGS. 4 and 5 the power adapter 1 also comprises a display unit 7. The display unit 7 is adapted and attached in such a way that, in an indirect powering operation, the loading or charge status and/or temperature of a remote, movable energy source, such as a backpack battery pack, can be displayed and observed by a user during operation of the power tool. Such a display unit 7 is of particular advantage for backpack battery packs, as the loading status of the battery pack on the back of the user in this way can be easily checked during operation of a tool connected to the energy source and power adapter 1. Signals for controlling the display unit may be outputted from an electronic controller or the like of the energy source. Of course it is also possible that the display unit 7 shows the charge status and/or temperature of batteries inside the power adapter 1 in a direct powering operation, in particular when the first fixture sub-unit 31 with the weight 4 is replaced by a sub-unit adapted for batteries.

Furthermore, the power adapter 1 may comprise a slewable cable outlet 8. The slewable cable outlet 8 has an outlet opening 9. The outlet opening 9 is adapted to guide through an electric cable (shown in FIG. 6 only) for connecting the power adapter 1, in particular electrical contacts of the coupling interface of the power adapter 1, to a remote energy source, such as a backpack battery pack.

The slewable cable outlet 8 may comprise or be constituted by a slewable member attached and mounted to the housing 2 to be slewable as indicated by the double arrow in FIG. 5. In FIG. 5, the slewable member is slewable in a horizontal plane. However, it is also or in the alternative possible to implement the slewable member to be slewable in a vertical plane. Such a slewable member will greatly ease operation of a tool or device connected to the power adapter 1 since the cable has a slewing range of up to 180° in a rotational movement. Of course also a spherical movement is possible, i.e. a rotation about two orthogonal axes.

Also the housing 2 comprises air vents 10 which allow a flow of air through the housing 2 which is not completely, in particular only slightly, filled. As can be seen, despite of the balance weight 4 and fixture unit 3 accommodated in the housing 2, the housing 2 still comprises a dead volume. This dead volume may contribute to enhanced air flow which may be used to cool the tool or device operated via the power adapter 1. So the cooling of the electronic components in the power adapter 1 and of the power tool 1 is improved.

Figure 6:
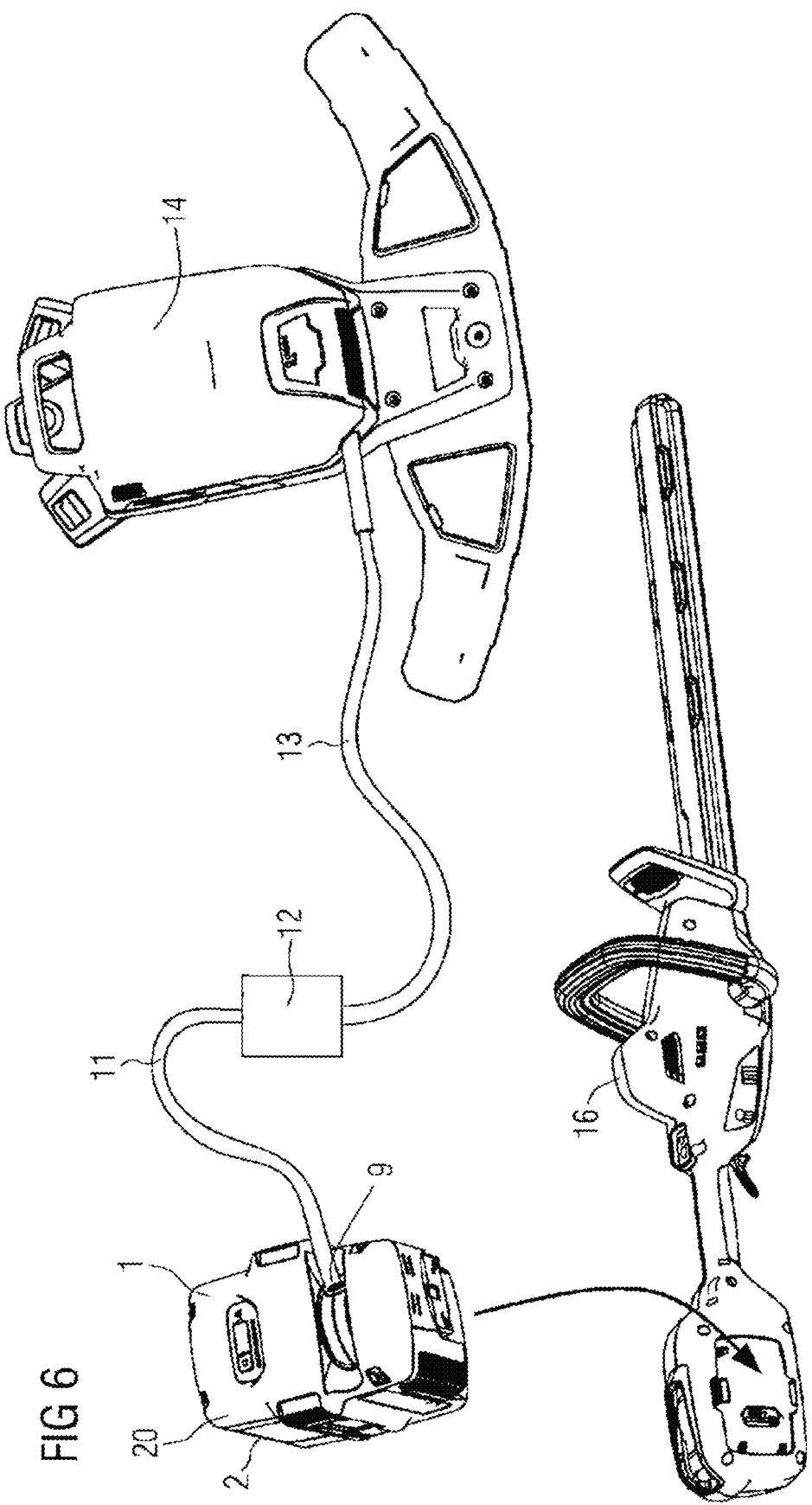
FIG. 6 shows a system comprising a power tool, a backpack battery pack assembly and a power adapter according to the invention.

In FIG. 6 an embodiment of the whole system including a power tool 16 with a power adapter 1 and an external battery supply, here a backpack battery assembly 14, is shown. The power adapter 1 has an electrical cable 11 exiting from its cable outlet 9 which electrical cable 11 is electrically connected through an electrical connector 12, in particular a magnetic or a plug-socket-connector, to an electrical cable 13 of a backpack battery assembly 14 to be carried on the back of a user while the user holds the power tool 16 in his hands. The power adapter 1 is for illustration purposes not yet inserted into the power tool 16. Although the power adapter 1 has a cord or cable for connection to the batteries, the power tool 16 itself remains a cordless power tool. In particular the cable will be carried by the user and not fall on the ground, nor and more important will the length of the cables 11 and 13 restrict the range of the power tool 16 thus maintaining the mobility of a cordless battery powered power tool.

Figure 7:
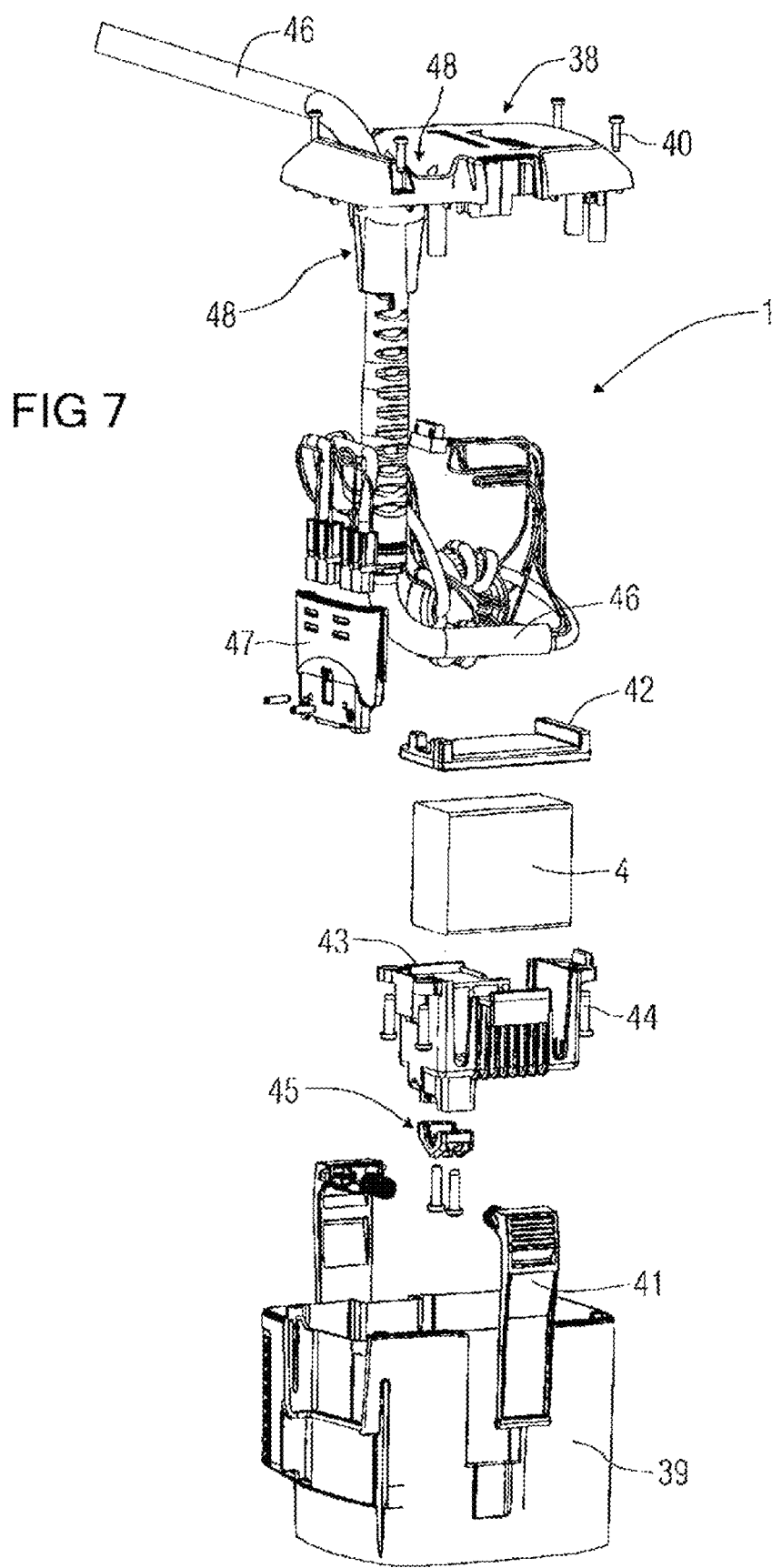
FIG. 7 shows an exploded view of a further embodiment of the power adapter according to the invention.

FIG. 7 shows an exploded view of a further embodiment of the power adapter 1 according to the invention. The power adapter 1 in this configuration comprises a base section 38 and a corresponding dome shaped cover 39. The base section 38 and cover 39 can be connected to each other, in the present case via screws 40, to establish a casing or housing adapted for accommodating elements or components of the power adapter 1.

Elements or components accommodated within the casing are as follows: a support plate 42 adapted for supporting a balancing weight 4 on the base section 38, and a retaining bracket 43 adapted for retaining and holding the balancing weight 4 on the base section 38. The bracket 43 at least partially embraces the balancing weight 4 and is adapted to be fixed to the base section 38, presently via further screws 44, optionally via shape-locking elements or connections and the like.

As can be seen from FIG. 7, the bracket 43 comprises on a side averted from the support plate 42 a cable clamp arrangement 45 adapted to tightly clamp cables such as for example a cable 46 for electric power supply.

The cable 46 is guided through the base section 38, through the inner of the casing and finally ends in a connector interface 47 adapted to establish electric contact and others to corresponding counter contacts of the cordless power tool.

As already becomes obvious from FIG. 7, the power adapter 1 in this configuration enables comparatively compact arrangements and designs of the elements arranged or accommodated within the casing. In particular beyond the balancing weight 4 and bracket 43 there is still room left for guiding cables, such as cable 46, and air ventilation through the casing.

As can also be seen from FIG. 7, the base section 38 comprises a cable bushing 48. The cable bushing 48 is implemented as a funnel shaped element extending from the base section 38 to the inner volume of the casing. As will become more obvious further below, the outer walls of the bushing 48 are designed to implement a funnel or cone having increasing cross sections in a direction from the inside of the casing towards its outside. Using such a funnel shaped cable bushing 48 has the advantage that the cable bending radii of the cable 46 can be kept at moderate values during operation or use of the power adapter 1. In particular too small bending radii probably causing cable damages may be avoided, at least at the cable bushing 48. Also, less space is needed to align the cable along the outside surface of the adapter or powertool.

Figure 8:
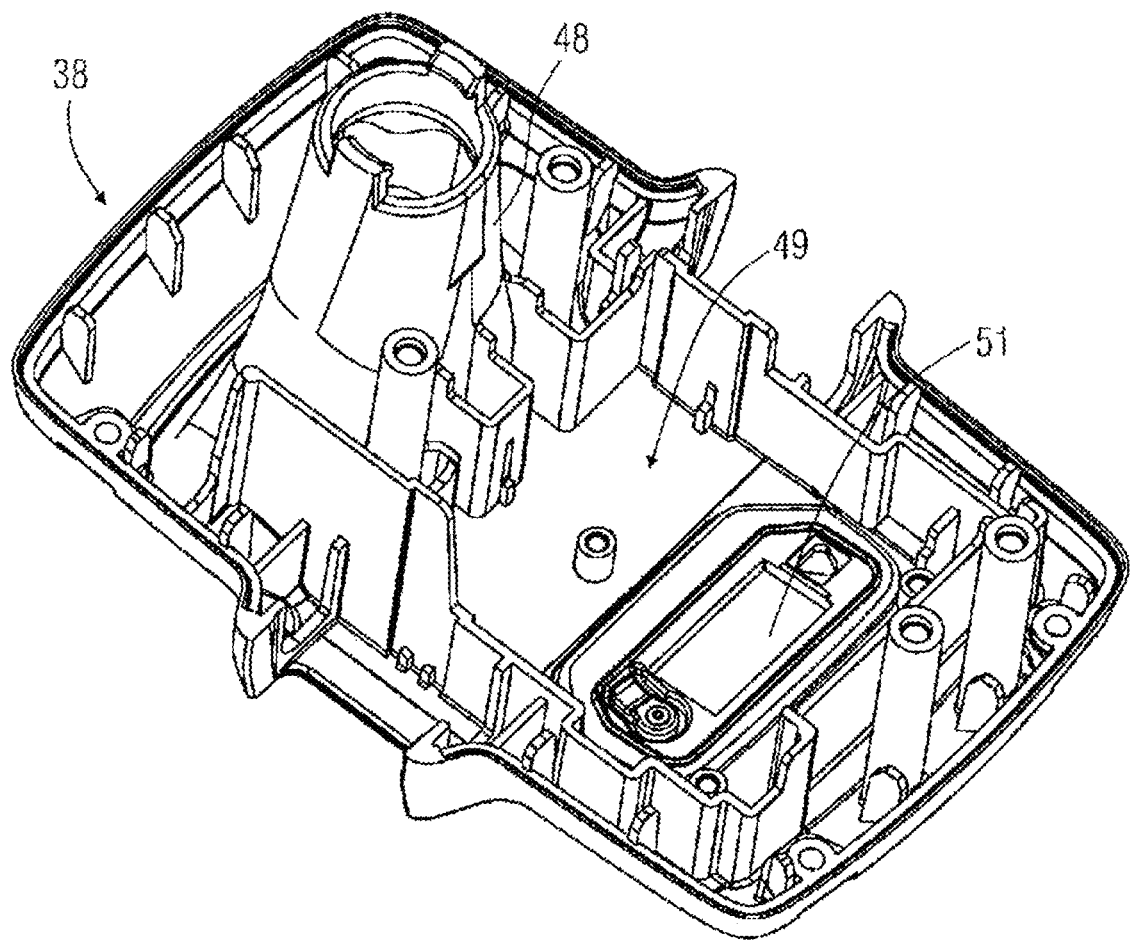
FIG. 8 shows a base section of the power adapter according to FIG. 7

FIG. 8 shows the base section 38 of the power adapter 1 in more detail. The base section 38 has an essentially rectangular shape and provides several elements for fixing the cover 39, bracket 43 and others. Further, the base section 38 may comprise at its inner side several reinforcement elements or ribs. However, the base section 38 of the present embodiment comprises a recess 49 which is adapted to accommodate a printed circuit board, in particular in a press-locking, shape-locking and/or snap-locking manner. The PCB may also be fastened by means of screws for example. Several support elements for supporting the printed circuit board are arranged in the recess 49.

Figure 9:
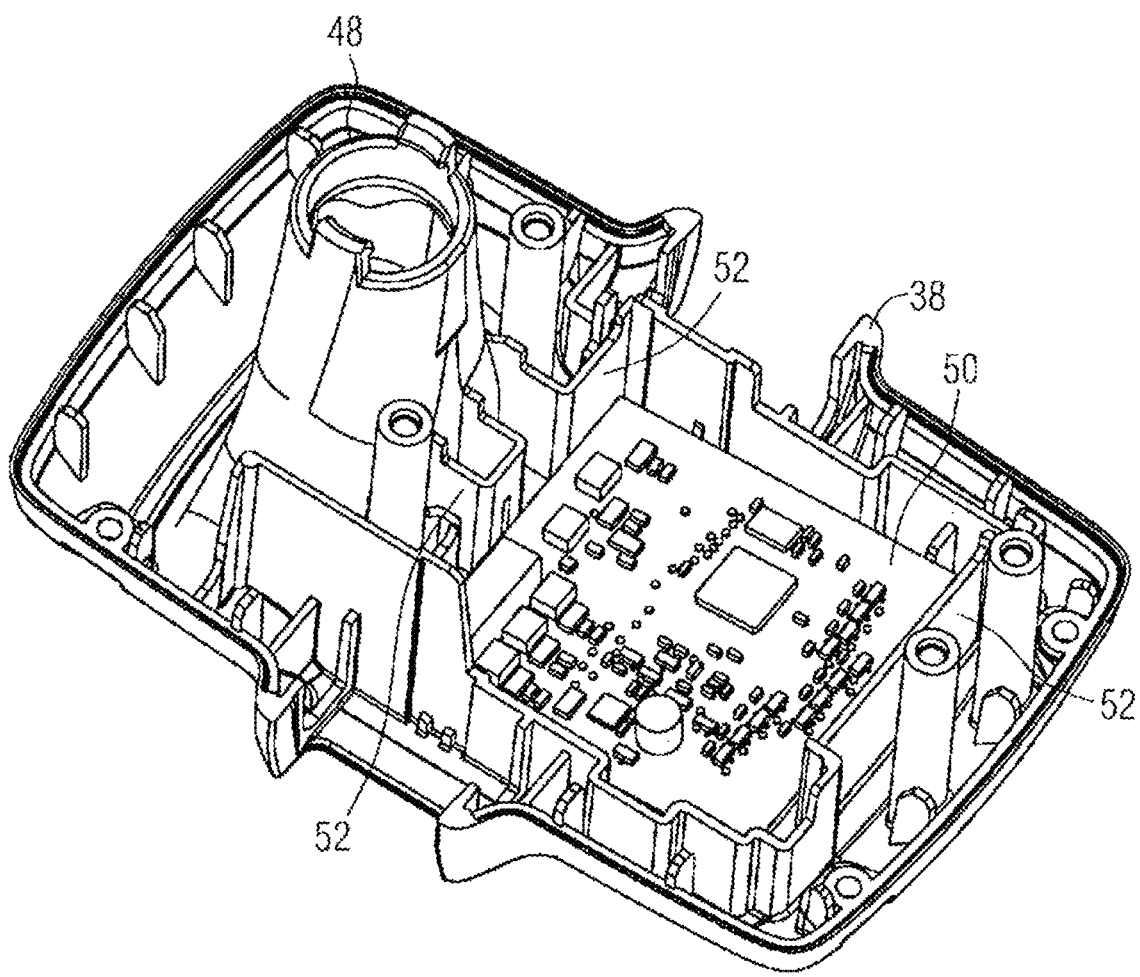
FIG. 9 shows the base section with a printed circuit board attached thereto.

FIG. 9 shows the base section 38 with the printed circuit board arranged within the recess 49, wherein the printed circuit board is designated with reference number 50. Mounting the printed circuit board within the base section 38 has the advantage that it can be protected against outer mechanical impacts, as the base section 38 is of comparative robust construction. Further, display and/or operating elements 51 (FIG. 8) or signs related to the printed circuit board 50 may be viewed through the base section 38, which in general is visible even if the power adapter 1 is coupled to a cordless power tool.

As has been described in connection with FIG. 7, the balancing weight is also mounted or fixed to the base section 38. As becomes clear from a combination of FIG. 7 to FIG. 9, the location of the printed circuit board 50 in the base section 38 at least overlaps with the mounting location of the balancing weight 4. In order to avoid the balancing weight 4 to directly rest on the printed circuit board 50, the base section 38 comprises several support ribs 52 adjacent to the recess 49. The support ribs 52 are adapted and configured such that they can support the support plate 42, and in particular can engage corresponding grooves or notches or ribs provided with the support plate 42.

Figure 10:
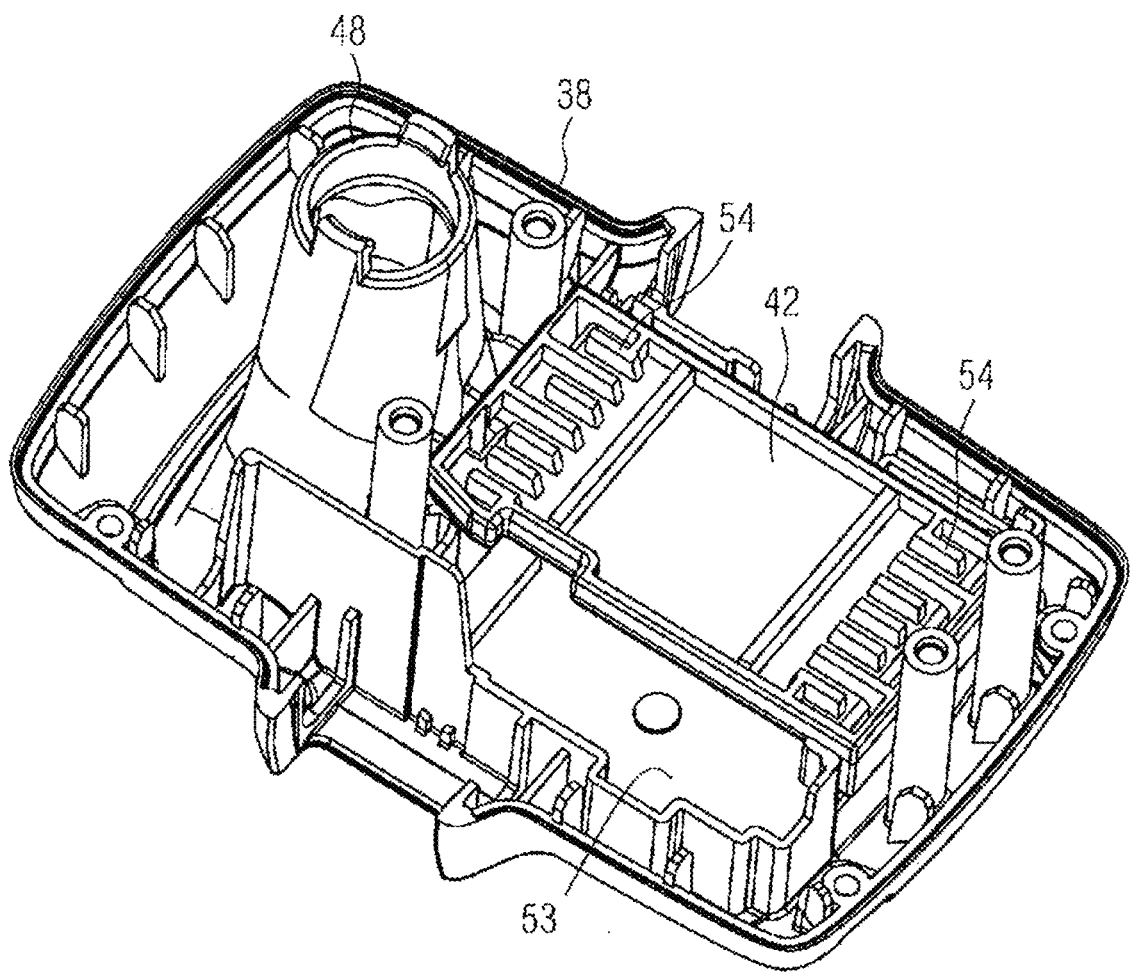
FIG. 10 shows the base section together with a support plate adapted to support the balancing weight.

Reference is now made to FIG. 10 showing the base section 38 together with the support plate 42 in a configuration suitable for supporting the balancing weight 4. It shall be noted, that the printed circuit board 50 is not visible in FIG. 10. This is due to the fact, that in the present embodiment, the recess 49 accommodating the printed circuit board 50 is potted or sealed with a potting or sealing compound 53, which is provided for protecting the printed circuit board 50 from outer influences.

Figure 11:
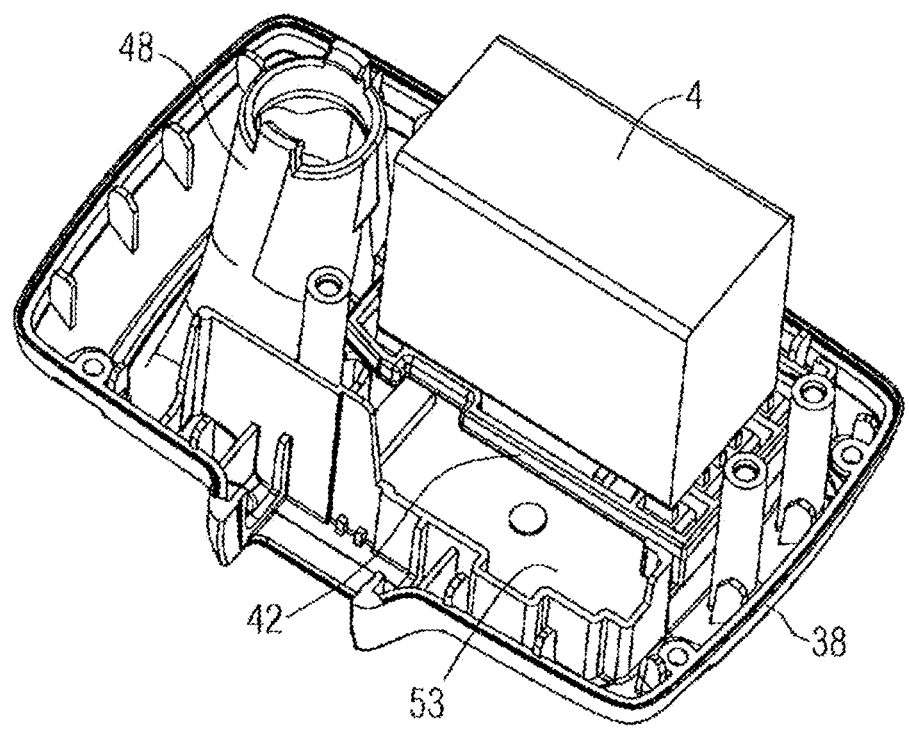
FIG. 11 shows a balancing weight arranged on the support plate.

Further, the support plate 42 connected to the base section 38 comprises or provides support bars 54 adapted to support the balancing weight 4 placed on the support plate 42. A respective arrangement of the balancing weight 4 on the support plate 42 can be seen in FIG. 11. From FIG. 11 it can in particular be seen that the support plate 42 fully supports the load of the balancing weight 4 and thereby prevents the load of the balancing weight 4 from acting on the printed circuit board 50 and/or potting or sealing compound 53.

Figure 12:
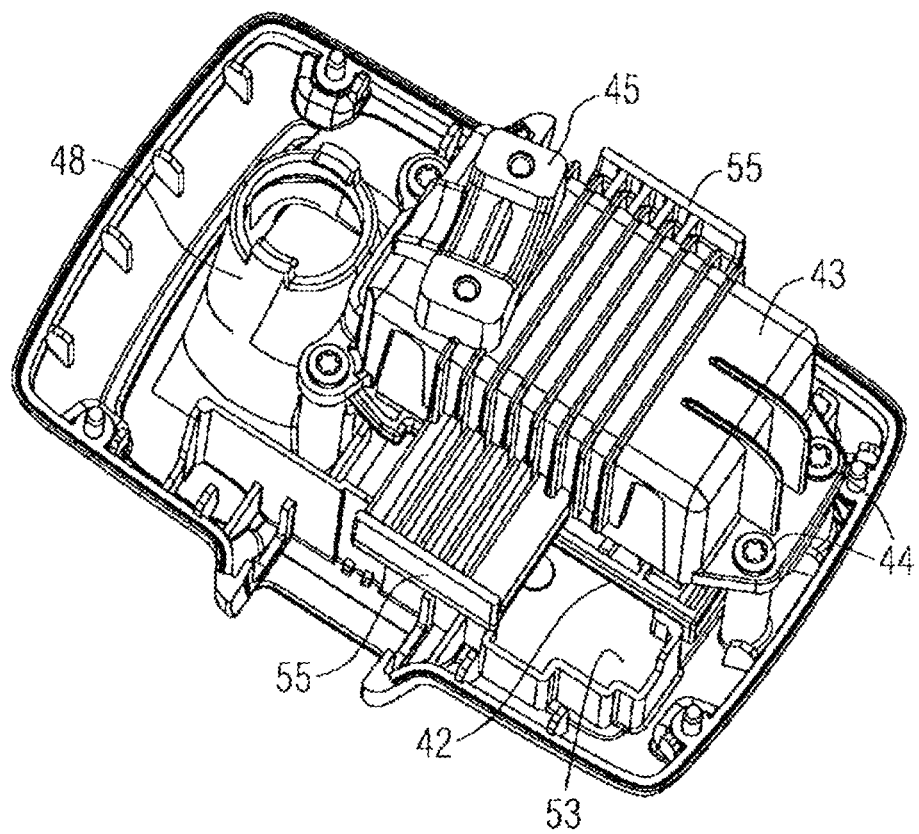
FIG. 12 shows a bracket mounted to the base section and fixing the balancing weight.

Reference is now made to FIG. 12 showing the balancing weight 4 attached or fixed to the base section 38 via the retaining bracket 43. The retaining bracket 43 in the present case is screw-mounted to the base section 38. Further, the retaining bracket 43 comprises stiffening elements, such as stiffening ribs, configured to firmly fix the balancing weight 4 to the base section 38 in particular in extreme situations, in particular in situations in which the power adapter crashes, unintentionally, to the ground and the like.

In FIG. 12 it can be seen that the retaining bracket 43 comprises at lateral sides, in the present case at two lateral sides averted from each other, a respective support jib 55. The support jibs 55 are designed such that the retaining bracket 43 is and will be supported against the inner walls of the cover 39 in case that the base section 38 and the cover 39 are connected to each other. The support jibs 55 may be effective in preventing cracking or rupturing the retaining bracket 43 and balancing weight 4 from the base section 38 under extreme loads, such for example occurring in instances where the power adapter, unintentionally, or in drop tests, crashes or is crashed to the ground.

Figure 13:
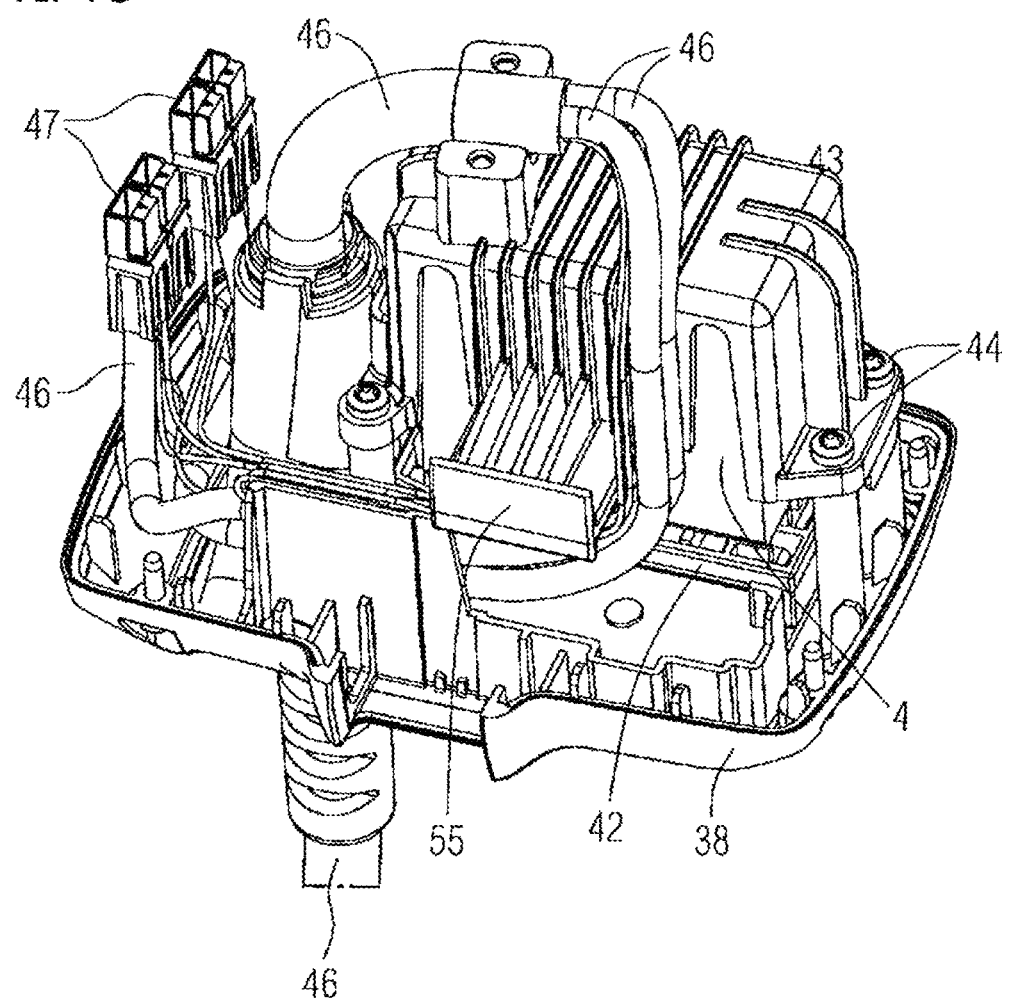
FIG. 13 shows the power adapter in a preassembled state.

As can be seen in more detail from FIG. 13, the support jigs 55 can have a secondary function in which the support jigs 55 are used for cable routing, as a cable holder and/or a cable retainer for the cable 46 or cables or other elements within the casing which is assembled from the base section 38 and cover 39 connected thereto.

FIG. 13 further shows that there is still room left within the casing which in particular is advantageous for allowing an air flow through the casing, in particular for cooling respective components accommodated therein.

Figure 14:
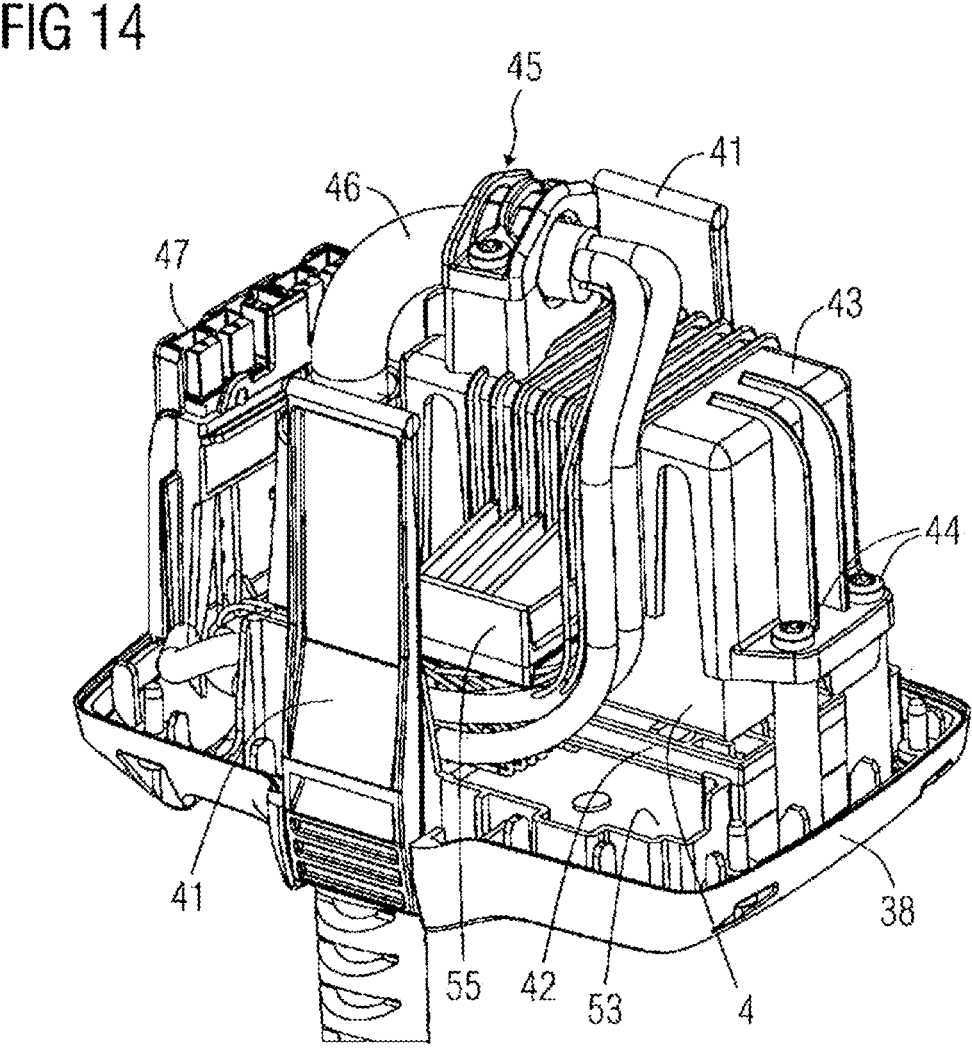
FIG. 14 shows the power adapter in an advanced preassembled state.

FIG. 14 shows the power adapter 1 in an advanced preassembled state in which the printed circuit board 50 is potted to the base section 38 and the balancing weight 4 is fixed to the base section 38 via the retaining bracket 43. Further, the cable 46 or parts thereof are fixed to respective retaining elements, in particular to the cable clamp arrangement 45 and support jib 55. The connector interface 47 is adequately mounted to the base section 38, and the snap locking elements 41 are connected to the base section 38.

In this state of assembly, the cover 39 can be imposed or put on the base section 38 and all elements assembled thereto, and the cover 39 can be fixed to the base section 38.

Figure 15:
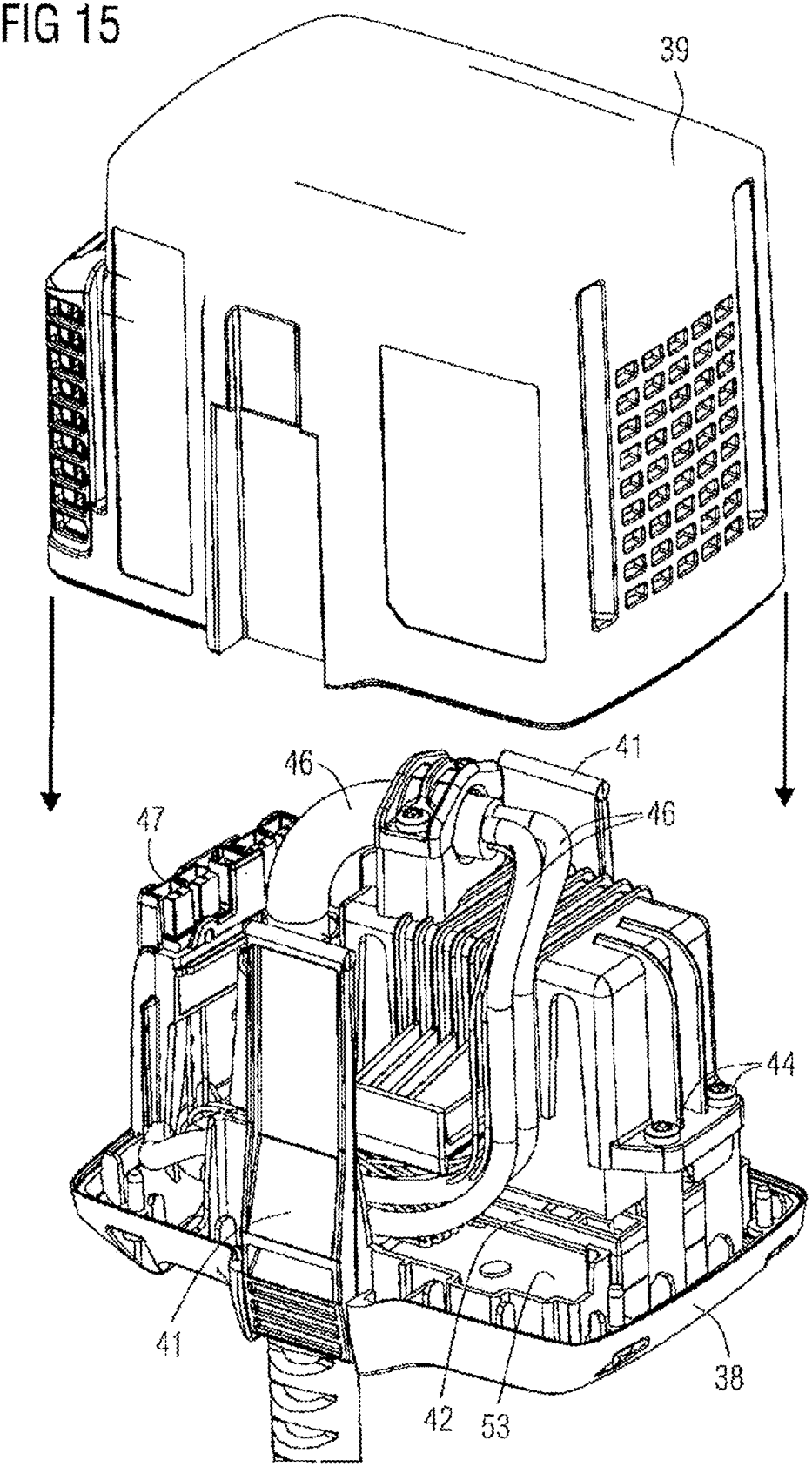
FIG. 15 shows the power adapter in an exploded view prior to assembly.

Here, it can in particular be seen that the proposed embodiment allows a great deal of preassembly work on the basis of the base section 38. In a final assembly step only the cover 39 may be connected, which in particular is indicated in FIG. 15 by arrows.

Figure 16:
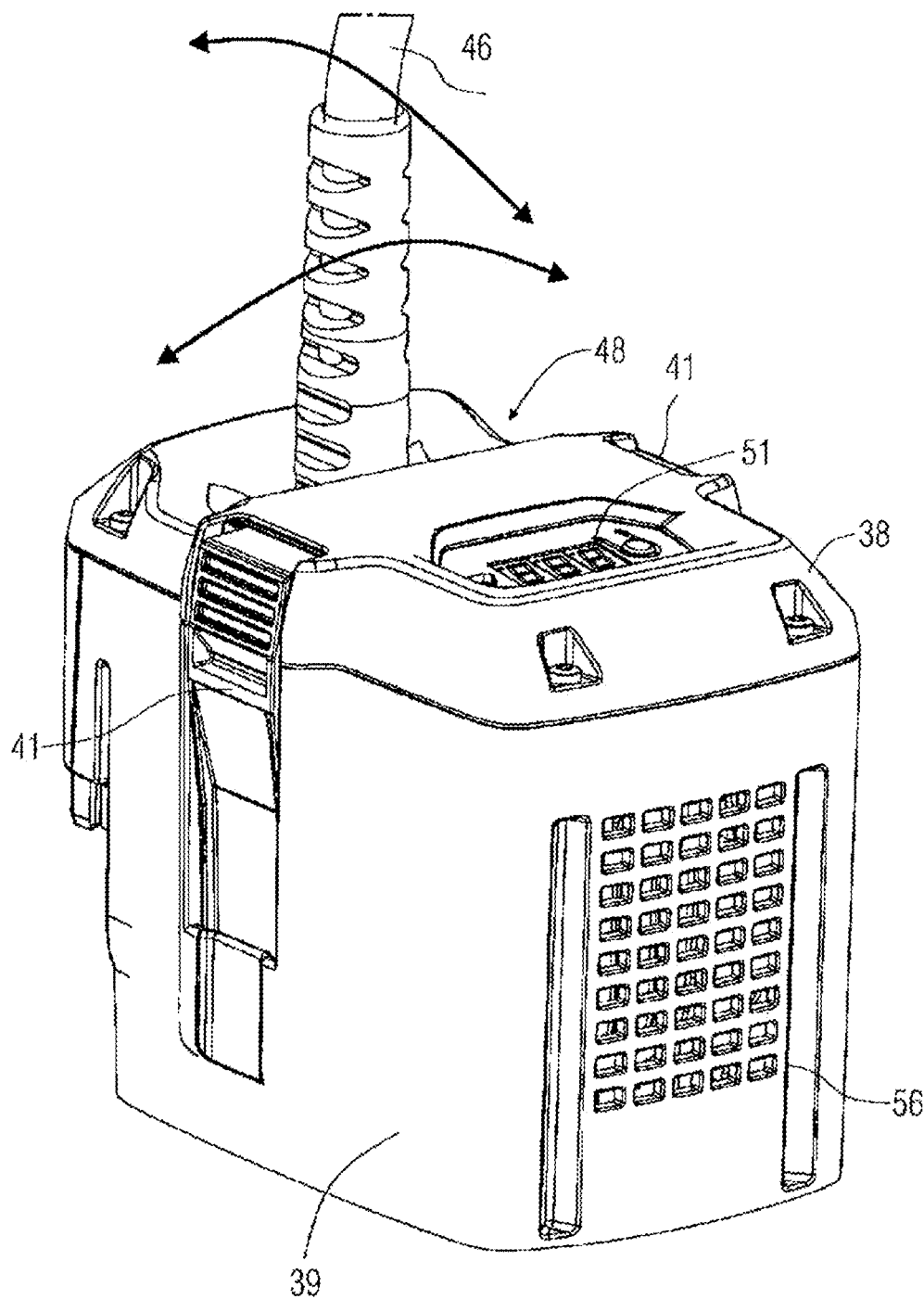
FIG. 16 shows the power adapter in the assembled state.

FIG. 16 shows the power adapter in the assembled state. From FIG. 16 it can be seen that the cover 39 comprises air vents 56 allowing a cooling airflow through the casing. Further, it can be seen that the display and/or operating element or unit 51 is freely accessible and visible even if the power adapter 1 should be connected to a power tool.

It can also be seen from FIG. 16, that the base section 38 may be screw mounted to the cover 39.

Figure 17:
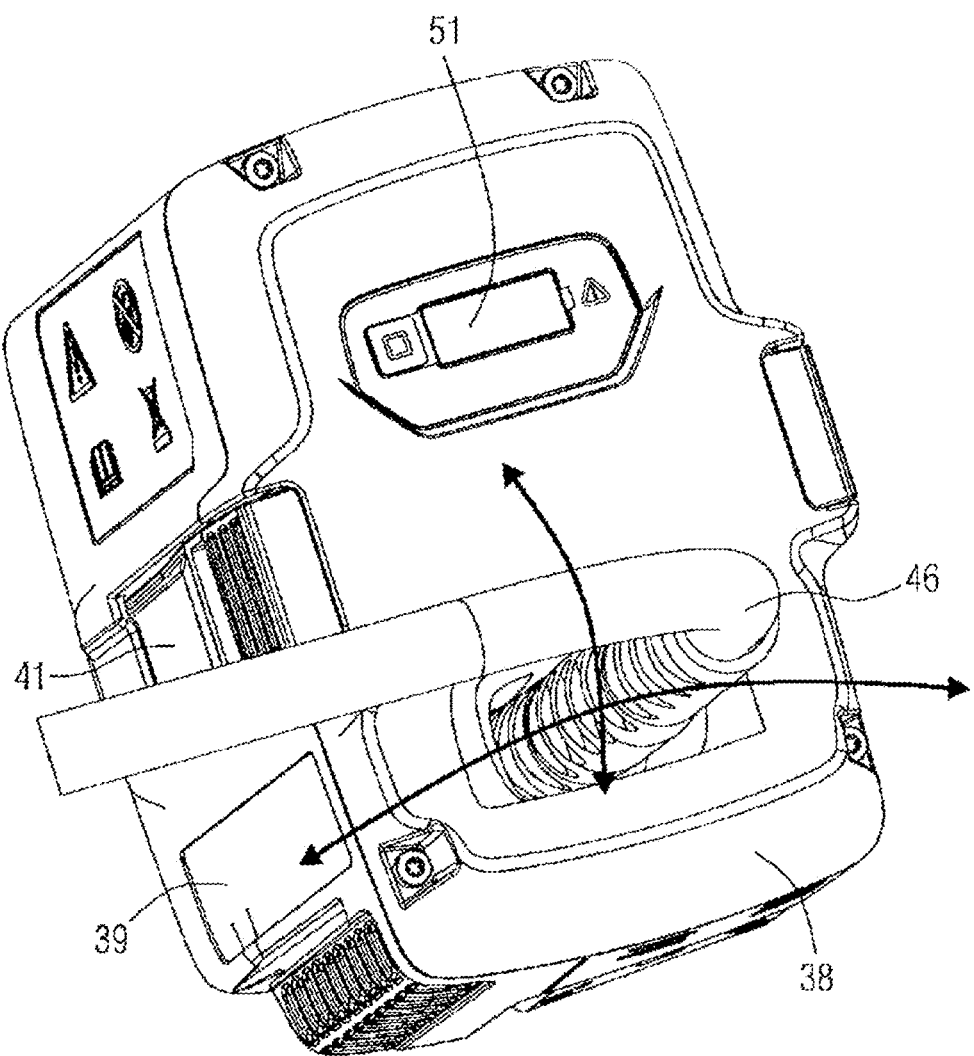
FIG. 17 shows a different perspective view of the power adapter in FIG. 16.

Reference is now made to FIG. 17 showing a different perspective view of the power adapter 1 in FIG. 16. As can be seen from a combination of FIG. 16 and FIG. 17, the cable bushing 48 is implemented as a funnel or cone shaped deepening providing convex outer walls for reducing or restricting the bending radii of the cable 46 during operation to moderate values. The bending radii in particular are selected such that damages to the cable 46 as a result of sharp bends at the cable bushing 48 can be avoided, and such that bending of the cable in a certain direction is facilitated.

As can be seen, the power adapter as proposed herein greatly improves operation of cordless tools, in particular cordless power tools, in cases in which comparatively heavy energy sources, i.e. battery pack with comparatively high load capacities are used.

REFERENCE SIGNS 1 power adapter
2 adapter housing
3 fixture unit
4 balance weight
5 fastening element
6 coupling interface
7 display unit
8 slewable cable outlet
9 outlet opening
10 air vent
11 electrical cable
12 electrical connector
13 electrical cable
14 backpack battery assembly
15 fastening elements
16 power tool
20 housing lid
31 first fixture sub-unit
32 second fixture sub unit
33 side wall
34 receiving space
35 receiving space
36 inner space
37 side wall
38 base section
39 cover
40 screw
41 snap locking element
42 support plate
43 retaining bracket
44 further screws
45 cable clamp arrangement
46 cable
47 connector interface
48 cable bushing
49 recess
50 printed circuit board
51 display and/or operating element
52 support rib
53 potting or sealing compound
54 support bar
55 support jib
56 air vent

The invention claimed is:

1. Energy source and power tool combination comprising a power tool, the combination comprising:
   a backpack battery assembly configured to be supported by shoulder straps on a back of a user;
   a power adapter comprising an adapter housing, the adapter housing comprising a base section and a cover configured to be coupled to the base section; and
   an electrical cable guided through the base section interconnecting the backpack battery assembly to the power adapter,
   wherein the power adapter is configured to physically engage and be electrically connected to the power tool,
   wherein responsive to insertion of the power adapter into the power tool, the cover of the adapter housing is surrounded by portions of the power tool while the base section remains exposed.

2. Combination according to claim 1, wherein the combination further comprises a rechargeable battery pack with the design and dimensions corresponding to a housing of the power adapter.

3. Combination according to claim 1, wherein the combination further comprises an electrical connector disposed between the backpack battery assembly and the power adapter.

4. Combination according to claim 3, wherein the electrical connector is configured to connect an electrical cable of the power adapter to an electrical cable of the backpack battery assembly.

5. Combination according to claim 1, wherein the power adapter comprises a display unit configured to display a charging condition or other parameter of the energy source.

6. Combination according to claim 1, wherein the combination further comprises a charging device, wherein the power adapter is connectable to the charging device for charging the backpack battery assembly.

7. Combination according to claim 1, wherein the power tool is a tool in a group consisting of hedge trimmers, clearing saws, chain saws, brush cutters, trimmers, and blowers.

* * * * *